(12) United States Patent
Aggarwal et al.

(10) Patent No.: US 7,966,519 B1
(45) Date of Patent: Jun. 21, 2011

(54) RECONFIGURATION IN A MULTI-CORE PROCESSOR SYSTEM WITH CONFIGURABLE ISOLATION

(75) Inventors: Nidhi Aggarwal, Sunnyvale, CA (US); Norman Paul Jouppi, Palo Alto, CA (US); Parthasararthy Ranganathan, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 290 days.

(21) Appl. No.: 12/250,381

(22) Filed: Oct. 13, 2008

Related U.S. Application Data

(60) Provisional application No. 61/049,173, filed on Apr. 30, 2008, provisional application No. 61/049,141, filed on Apr. 30, 2008, provisional application No. 61/049,151, filed on Apr. 30, 2008.

(51) Int. Cl.
G06F 11/00 (2006.01)

(52) U.S. Cl. ............................................. 714/10; 712/15
(58) Field of Classification Search .................... 714/10
See application file for complete search history.

(56) References Cited

U.S. PATENT DOCUMENTS

| | | | | |
|---|---|---|---|---|
| 6,700,142 B1* | 3/2004 | Norman | ......................... | 257/202 |
| 7,673,163 B2* | 3/2010 | Tsukimori et al. | ............. | 713/323 |
| 2004/0215987 A1* | 10/2004 | Farkas et al. | ................... | 713/300 |
| 2008/0012583 A1* | 1/2008 | Audet et al. | ................... | 324/713 |
| 2008/0022151 A1* | 1/2008 | Stange et al. | .................... | 714/10 |
| 2008/0120515 A1* | 5/2008 | Ritz et al. | ....................... | 713/601 |
| 2008/0120518 A1* | 5/2008 | Ritz et al. | ............................... | 714/3 |
| 2008/0148015 A1* | 6/2008 | Takamoto et al. | ............. | 712/203 |
| 2008/0163255 A1* | 7/2008 | Munoz et al. | ................. | 719/318 |
| 2008/0229146 A1* | 9/2008 | Arai | ................................ | 714/13 |
| 2008/0235454 A1* | 9/2008 | Duron et al. | ................... | 711/128 |
| 2008/0244294 A1* | 10/2008 | Allarey | ........................... | 713/324 |
| 2008/0262763 A1* | 10/2008 | Sedeh | .............................. | 702/66 |
| 2009/0083554 A1* | 3/2009 | Belmont et al. | .............. | 713/300 |
| 2009/0094481 A1* | 4/2009 | Vera et al. | ........................ | 714/11 |

OTHER PUBLICATIONS

Gold, Brian et al.., "Truss: A reliable, Scalable, Server Architecture," IEEE Micro, 2005 pp. 51-59.

Aggarwal, Nidhi et al. "Configurable Isolation: Building High Availability Systems with Commodity Multi-Core Processors"; ISCA '07, Jun. 9-13, 2007.

Aggarwal, Nidhi et al. "Altering a Degree of Redundancy Used During Execution of an Application"; U.S. Appl. No. 61/049,141, filed Oct. 13, 2008

Aggarawal, Nidhi et al. "Selective Availability in Processor Systems"; U.S. Appl. No. 61/049,151, filed Apr. 30, 2008.

Bernick et al.,"NonStop Advanced Architecture," Proceedings of the 2005 International Conference on Dependable Systems and Networks, pp. 12-25.

Bressoud, Thomas and Schneider, Fred, "Hyperviosr-Based Fault-Tolerance," ACM Trans.Computer Systems, vol. 14, No. 1. Feb. 1996, pp. 80-107.

(Continued)

*Primary Examiner* — Scott T Baderman
*Assistant Examiner* — Chae Ko

(57) ABSTRACT

Methods and integrated circuits for reconfiguration in a multi-core processor system with configurable isolation are described. According to one embodiment, a processor configuration method includes determining that a first module is faulty. A second module is configured to communicate with the first module when the first module is not faulty. The method also includes analyzing a third module with respect to a substitution criterion, selecting the third module based on the analyzing determining that the third module satisfies the substitution criterion, and subsequent to the selecting, configuring the second module to communicate with the third module instead of the first module. Additional embodiments are described in the disclosure.

18 Claims, 7 Drawing Sheets

OTHER PUBLICATIONS

Gomaa, M. et al., "Transient-Fault Recovery for Chip Multiprocessors," International Symposium on Computer Architecture, 2003.

Kumar, Rakesh et al. "Single-ISA Hetergeneous Multi-Core Architecture for Multithreaded Workload Performance" 31st International Symposium on computer Architecture, Jun. 2004.

Srinivasan, J. et al. "the Impact of Technology Scaling on Lifetime Reliability" The International Conference on Depenable Systems and Networks (DSN-04) Jun. 2004.

U.S. Appl. No. 11/787,881 Inventor: Aggarwal, Nidhi et al. filed Apr. 17, 2007.

* cited by examiner

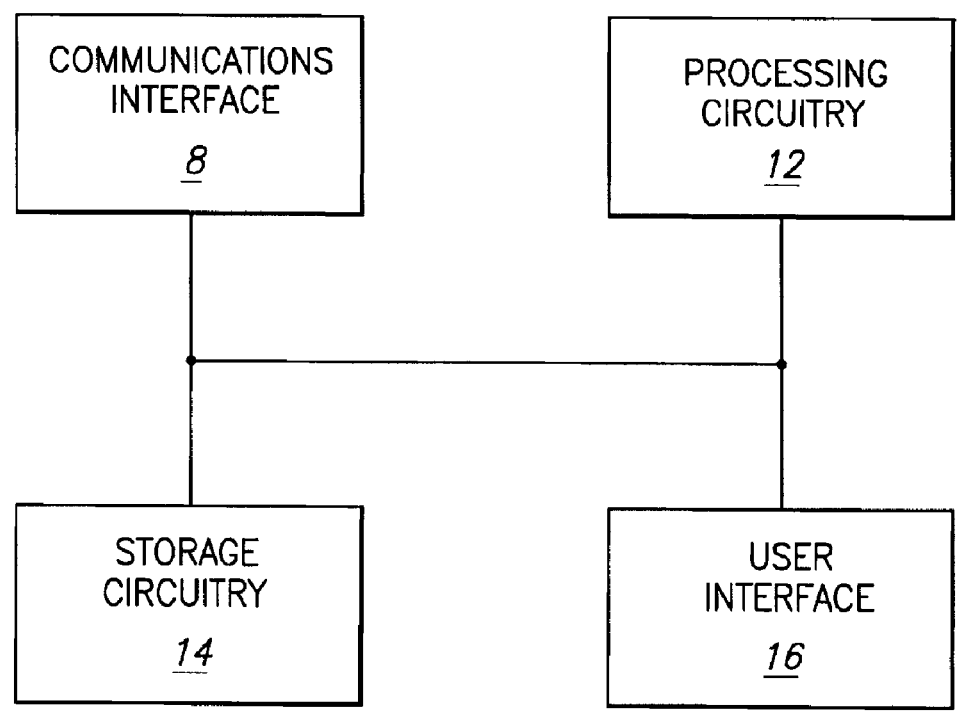

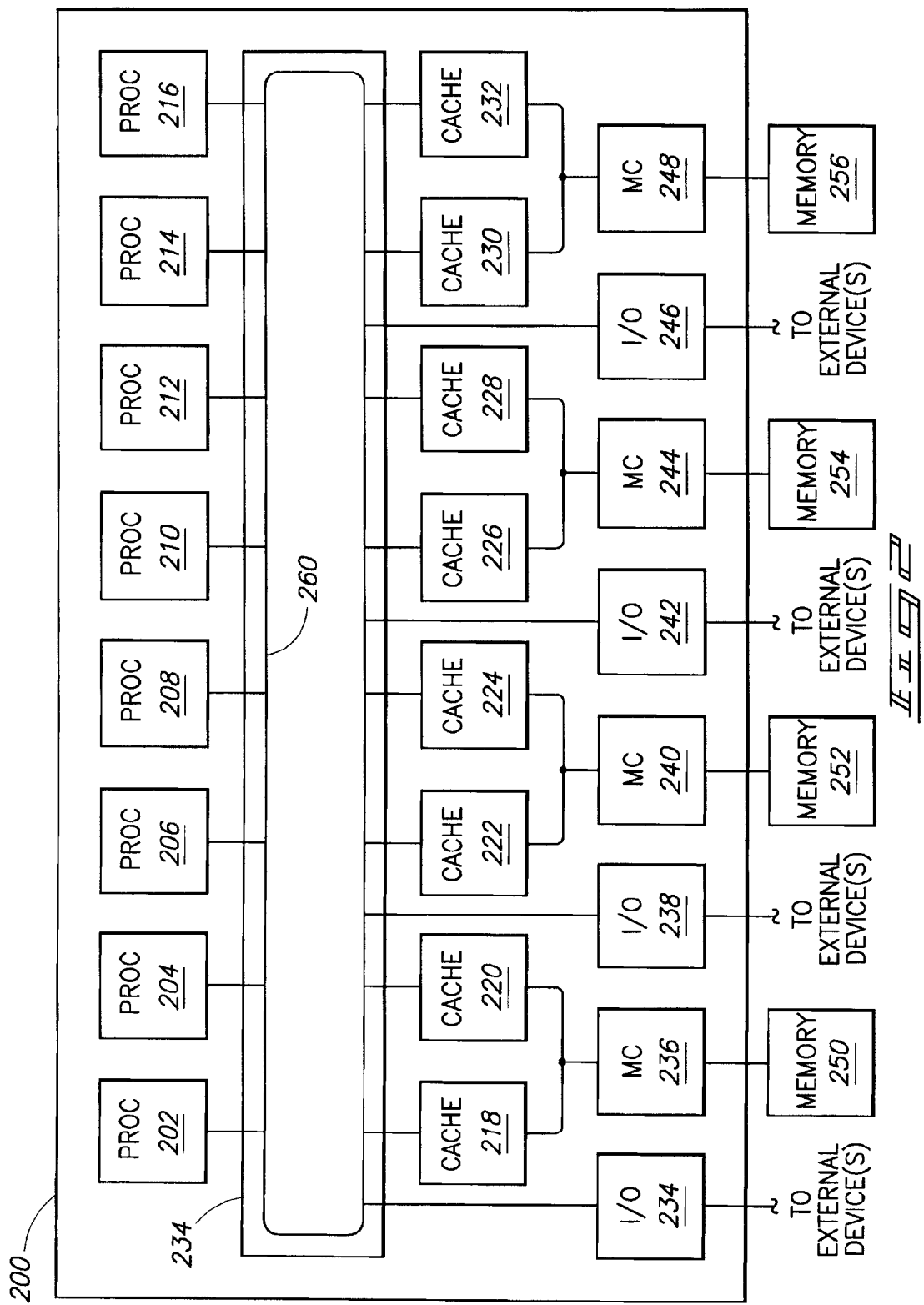

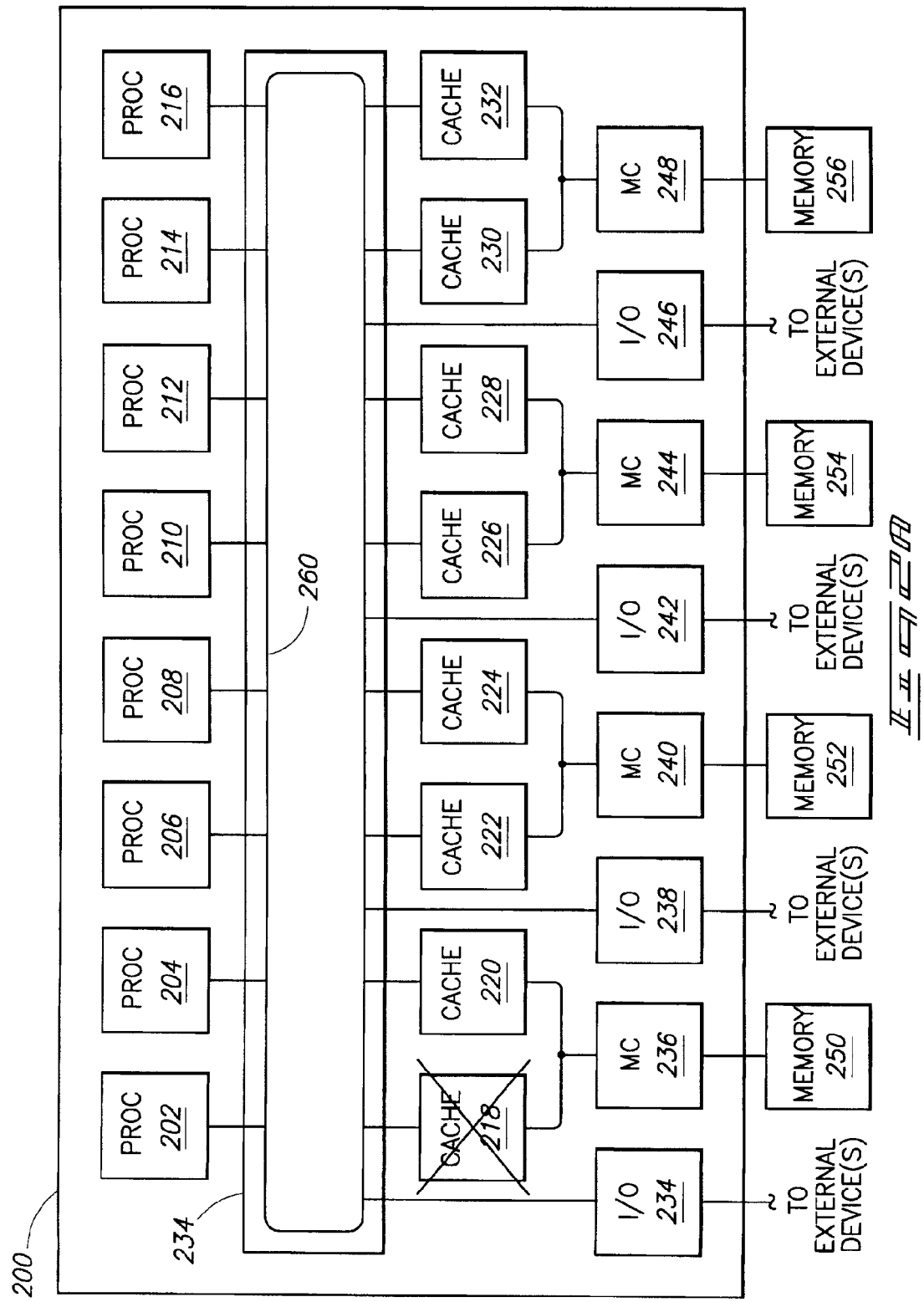

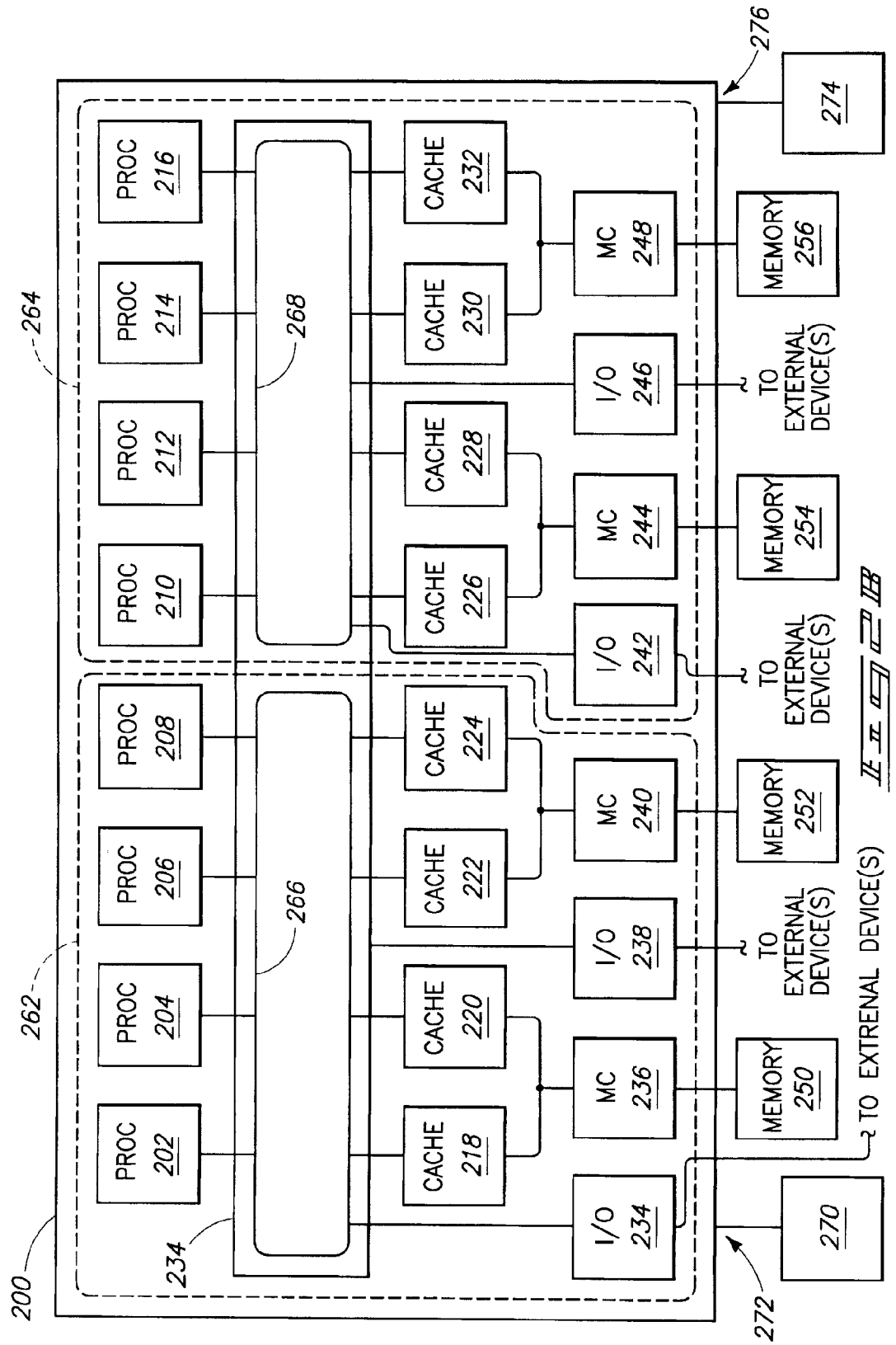

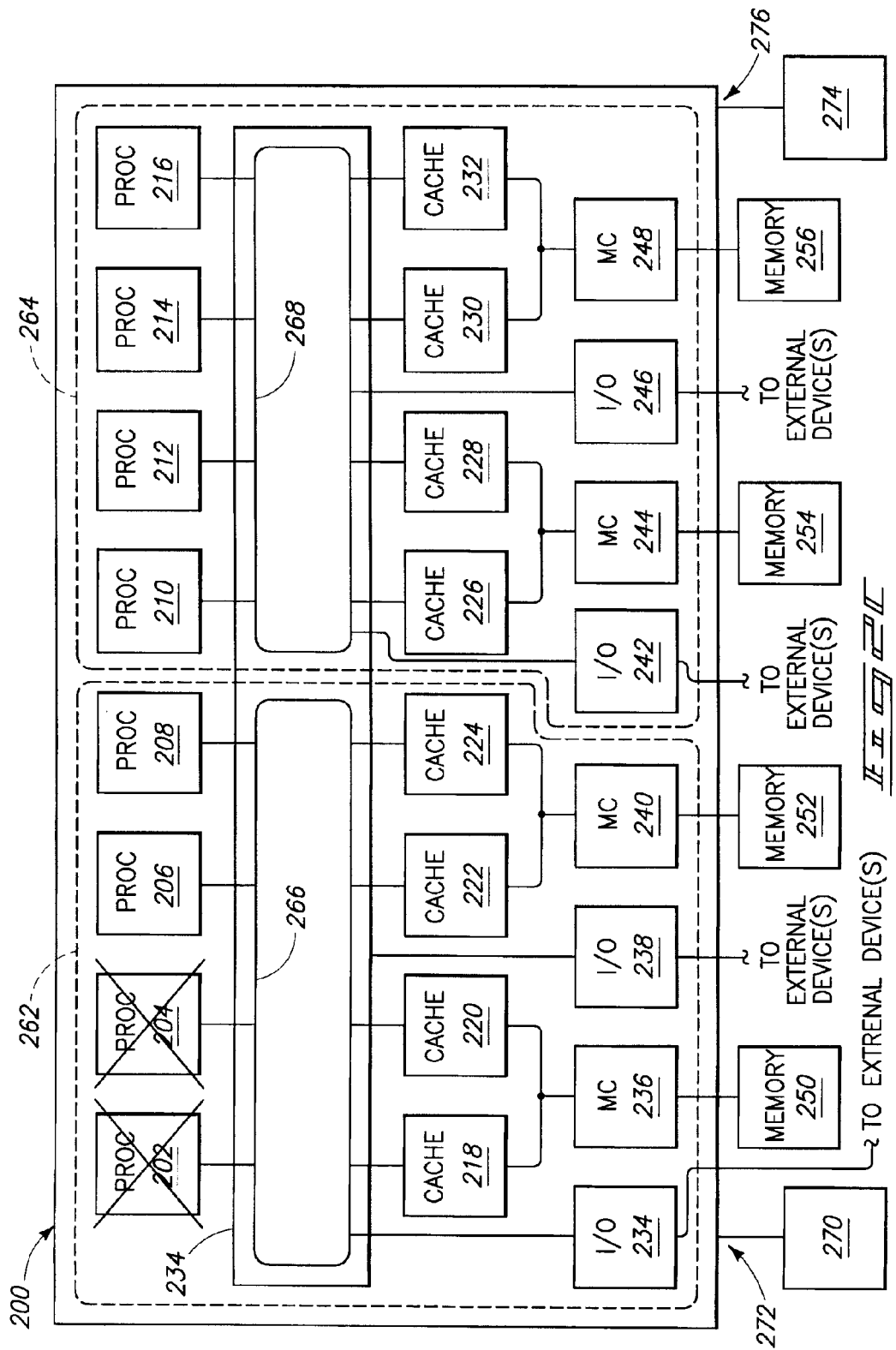

RECONFIGURATION IN A MULTI-CORE PROCESSOR SYSTEM WITH CONFIGURABLE ISOLATION

CROSS-REFERENCE TO RELATED APPLICATIONS

This patent application claims the benefit of priority under 35 U.S.C. §119(e) to U.S. Provisional patent application Ser. No. 61/049,173, filed Apr. 30, 2008, entitled "Reconfiguration In A Multi-core Processor System With Configurable Isolation," having the same inventors and which is hereby incorporated by reference in its entirety.

Attention is directed to the following commonly assigned applications, which are incorporated herein by reference: U.S. Patent Application No. 61/049,141 filed Apr. 30, 2008 entitled "Altering a Degree of Redundancy Used During Execution of an Application" naming Nidhi Aggarwal, Norman Paul Jouppi, and Parthasarathy Ranganathan as inventors, which is incorporated herein by reference; U.S. Patent Application No. 61/049,151 filed Apr. 30, 2008 entitled "Selective Availability in Processor Systems" naming Nidhi Aggarwal, Norman Paul Jouppi, and Parthasarathy Ranganathan as inventors, which is incorporated herein by reference; and U.S. patent application Ser. No. 11/787,881 entitled "Chip Multiprocessor with Configurable Fault Isolation" naming Nidhi Aggarwal, Norman Paul Jouppi, and Parthasarathy Ranganathan as inventors which is incorporated herein by reference.

FIELD OF THE DISCLOSURE

Aspects of the disclosure relate to reconfiguration in a multi-core processor system with configurable isolation.

BACKGROUND OF THE DISCLOSURE

Monolithic integrated circuit chips may include more than one processor core. Such chips may be referred to as chip multiprocessors. Chip multiprocessors may use one processor core of the chip multiprocessor to execute instructions of a first application and may simultaneously use another processor core of the chip multiprocessor to execute instructions of a second application. Doing so may reduce an amount of time used to execute the instructions of the first and second applications when compared to a chip having a single processor core that multiplexes execution of instructions of both the first and second applications.

SUMMARY

According to some aspects of the disclosure, methods and integrated circuits for reconfiguration in a multi-core processor system with configurable isolation are described.

According to one embodiment, a processor configuration method includes determining that a first module is faulty. A second module is configured to communicate with the first module when the first module is not faulty. The method also includes analyzing a third module with respect to a substitution criterion, selecting the third module based on the analyzing determining that the third module satisfies the substitution criterion, and, subsequent to the selecting, configuring the second module to communicate with the third module instead of the first module.

According to another embodiment, an integrated circuit includes a first module of a processor configured to perform a function of the processor, a plurality of additional modules, and processing circuitry. The processing circuitry is configured to determine that the first module is faulty, to select a replacement module from among the plurality of additional modules according to a substitution criterion, and to configure the replacement module to perform the function of the first module instead of the first module.

Other embodiments are described as is apparent from the following discussion.

DESCRIPTION OF THE DRAWINGS

FIG. 1 is a block diagram of a computer according to one embodiment.

FIG. 2 is a block diagram of a processor according to one embodiment.

FIG. 2A is a block diagram of a processor according to one embodiment.

FIG. 2B is a block diagram of a processor according to one embodiment.

FIG. 2C is a block diagram of a processor according to one embodiment.

FIG. 2D is a block diagram of a processor according to one embodiment.

DETAILED DESCRIPTION

Figure 1A:
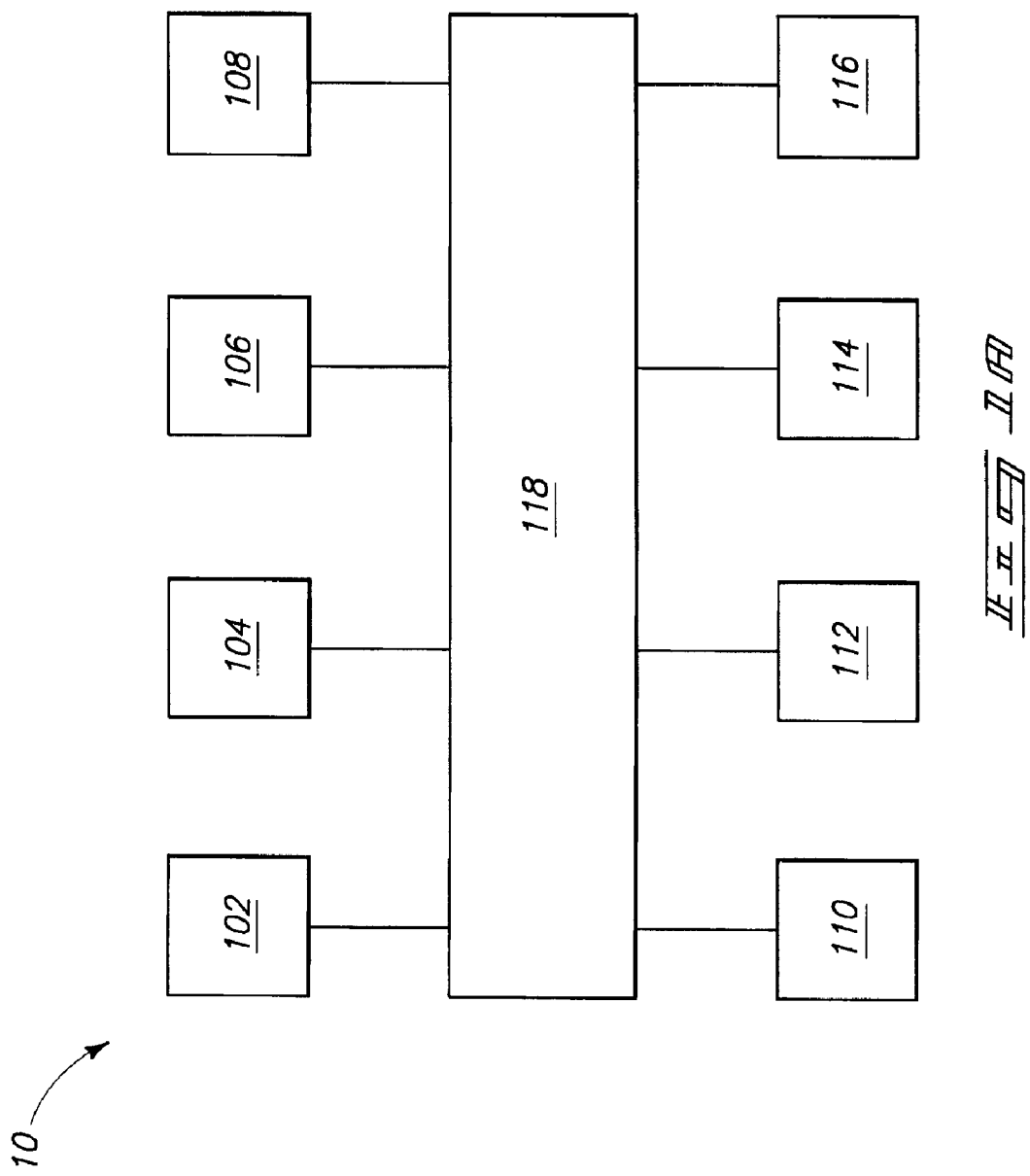
FIG. 1A is a block diagram of a processor according to one embodiment.
Figure 7:
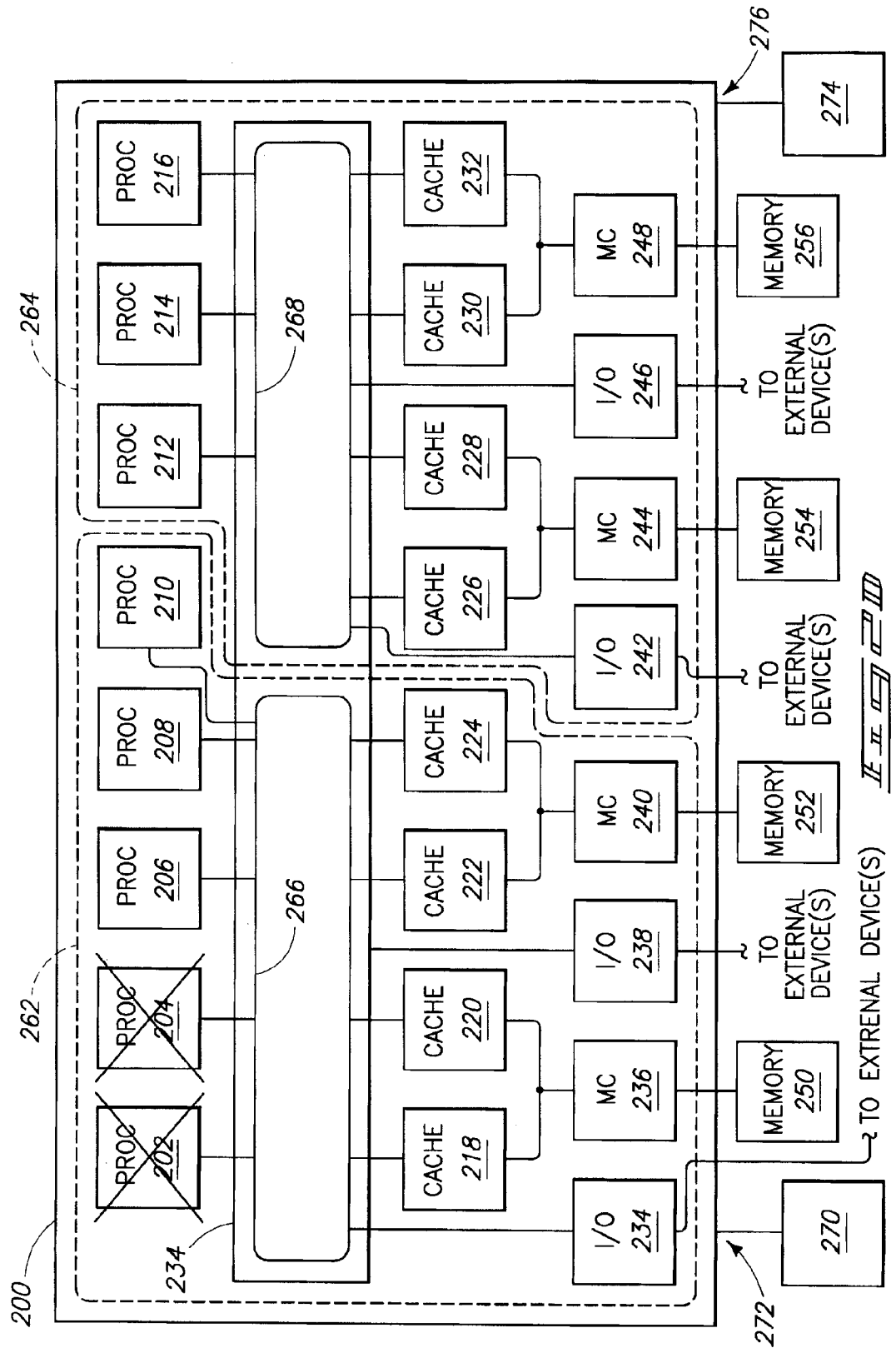

Attention is directed to the following commonly assigned applications, which are incorporated herein by reference: U.S. Patent Application No. 61/049,141 entitled "Altering a Degree of Redundancy Used During Execution of an Application" naming Nidhi Aggarwal, Norman Paul Jouppi, and Parthasarathy Ranganathan as inventors, which is incorporated herein by reference; U.S. Patent Application No. 61/049,151 entitled "Selective Availability in Processor Systems" naming Nidhi Aggarwal, Norman Paul Jouppi, and Parthasarathy Ranganathan as inventors, which is incorporated herein by reference; and U.S. patent application Ser. No. 11/787,881 entitled "Chip Multiprocessor with Configurable Fault Isolation" naming Nidhi Aggarwal, Norman Paul Jouppi, and Parthasarathy Ranganathan as inventors which is incorporated herein by reference.

The present disclosure is directed towards computers, processors, and methods of operating or configuring processors in example embodiments. According to some aspects of the disclosure, integrated circuits and processor configuration methods detect a faulty module of a processor and select a substitute module from among a plurality of modules of the processor using a substitution criterion. The faulty module may have been associated with other modules of the processor and may have been configured to communicate with one or more of the other modules. In one embodiment, the substitution criterion may specify a relationship between the substitute module and one or more of the other modules with which the faulty module was associated. For example, the relationship may involve distances, thermal parameters, connectivity, service level agreements, and/or membership in a fault domain. Once selected, the substitute module may be configured to take the place of the faulty module. Other embodiments are described in the following disclosure.

Referring to FIG. 1, a computer 100 is illustrated. Computer 100 includes a communications interface 8, processing circuitry 12, storage circuitry 14, and a user interface 16.

Communications interface 8 may enable computer 100 to communicate with other devices (e.g., other computers). For example, communications interface 8 may be a network interface.

Processing circuitry 12 may comprise circuitry configured to implement desired programming provided by appropriate media in at least one embodiment. For example, processing circuitry 12 may be implemented as one or more of a processor and/or other structure configured to execute executable instructions including, for example, software and/or firmware instructions, and/or hardware circuitry. Exemplary embodiments of processing circuitry 12 include hardware logic, PGA, FPGA, ASIC, state machines, and/or other structures alone or in combination with a processor. These examples of processing circuitry 12 are for illustration and other configurations are possible.

In one specific example, a processor of the processing circuitry 12 may include a plurality of different types of modules, which perform different processor functions. For example, the modules may include a processor core module which processes data (e.g., executes instructions), a cache memory module which stores data used by a processor core module, a memory controller module which facilitates an exchange of data between a cache memory module and an external memory device, and an input/output (I/O) controller module which enables a processor core module to communicate with other devices. In one more specific example embodiment, the processor is a multiprocessor, which includes a plurality of the same type of modules (e.g., processor core modules). In another example, only one type of a module is present in the processor.

Furthermore, the processor may take a number of different physical forms. In one embodiment, the processor may be a single monolithic integrated circuit chip. The single monolithic integrated circuit chip may include one or more processor cores. In some embodiments, if the single monolithic integrated circuit chip includes more than one processor core, the integrated circuit may be referred to as a chip multiprocessor.

In another embodiment, the processor may include more than one integrated circuit chip. For example, the processor may include a plurality of integrated circuit chips and one or more of the integrated circuit chips of the plurality may include a plurality of processor cores.

In one embodiment, processing circuitry 12 may monitor and/or configure the processor. The portions of processing circuitry 12 configured to monitor and/or configure the processor may be part of the processor itself or may be circuitry separate from the processor (e.g., a separate processor). In one embodiment, processing circuitry 12 may determine that a first module of the processor is faulty. Consequently, processing circuitry 12 may select a replacement module from among a plurality of modules of the processor according to a substitution criterion. Processing circuitry 12 may then configure the replacement module to perform the function of the faulty first module instead of the first module.

In one embodiment, processing circuitry 12 may configure the processor to execute applications including operating systems and/or virtual machines. In fact, in one embodiment, the processor may execute more than one operating system or virtual machine. In doing so, processing circuitry 12 may act as a hypervisor and/or virtual machine monitor and may use hypervisor-based process pairing or other techniques. Alternatively or additionally, processing circuitry 12 may configure the processor to execute an application redundantly.

Storage circuitry 14 may be embodied in a number of different ways using electronic, magnetic, optical, electromagnetic, or other techniques for storing information. Some specific examples of storage circuitry include, but are not limited to, a portable magnetic computer diskette, such as a floppy diskette, zip disk, hard drive, random access memory, read only memory, flash memory, cache memory, and/or other configurations capable of storing programming, data, or other digital information. In one embodiment, storage circuitry 14 may store programming implemented by processing circuitry 12.

At least some embodiments or aspects described herein may be implemented using programming stored within appropriate processor-usable media and configured to control appropriate processing circuitry. For example, programming may be provided via appropriate media including, for example, embodied within articles of manufacture.

User interface 16 is configured to interact with a user including conveying data to a user (e.g., displaying data for observation by the user, audibly communicating data to a user, etc.) as well as receiving inputs from the user (e.g., tactile input, voice instruction, etc.). Accordingly, in one exemplary embodiment, the user interface may include a display (e.g., cathode ray tube, LCD, etc.) configured to depict visual information and an audio system as well as a keyboard, mouse and/or other input device. Any other suitable apparatus for interacting with a user may also be utilized.

Referring to FIG. 1A, one embodiment of a processor 10 of processing circuitry 12 is illustrated. Processor 10 includes modules 102, 104, 106, 108, 110, 112, 114, and 116 and interconnection circuitry 118. As mentioned above, the modules of processor 10 may perform processor functions. For example, the modules of processor 10 may be processor cores, cache memories, memory controllers, or I/O controllers. Interconnection circuitry 118 may enable communication between the modules.

In one embodiment, module 102 may be a processor core and module 110 may be a cache memory. Accordingly, module 110 may store data and instructions and module 102 may retrieve the instructions from module 110 via interconnection circuitry 118 and may execute the instructions. In doing so, module 102 may retrieve data from module 110 via interconnection circuitry 118 and/or write data to module 110 via interconnection circuitry 118.

In one embodiment, the modules of processor 10 may be associated with each other in a particular way in order to communicate with each other. For example, module 102 may be associated with module 110 so that module 102 and module 110 may communicate with each other. Specifically, module 110 may store instructions and data and may provide the instructions and data to module 102. Module 102 may provide data to module 110. Similarly, in one embodiment, modules 104, 106, and 108 may be processor cores that are associated respectively with modules 112, 114, and 116, which may be cache memories.

In one embodiment, modules 102, 104, 106, and 108 may perform the same function (e.g., processing instructions) but may perform the function using different data. For example, modules 102 and 104 may both be processor cores that execute instructions but module 102 may execute different instructions than module 104. Similarly, modules 112, 114, 116, and 118 may perform the same function (e.g., storing data and instructions) but may perform the function using different data. For example, modules 110 and 112 may both be cache memories that store instructions and data, but module 110 may store different instructions and data than module 112.

In one embodiment, one or more of the modules of processor 10 may be a different integrated circuit chip and interconnection circuitry 118 may be a network or bus connecting the different chips together. In another embodiment, the modules of processor 10, as well as interconnection circuitry 118, may be included in a single monolithic integrated circuit chip.

Interconnection circuitry 118 may enable communication between the modules of processor 10. In one embodiment, interconnection circuitry 118 may enable each module of processor 10 to communicate with every other module of processor 10. In another embodiment, interconnection circuitry 118 may enable each module of processor 10 to communicate with some of the other modules of processor 10, but not all of the other modules of processor 10. In one embodiment, interconnection circuitry 118 may selectively enable communication between the modules of processor 10.

Processing circuitry 12 may reconfigure the associations between the modules of processor 10 if one or more of the modules of processor 10 become faulty. For example, modules 102, 104, 106, and 108 may be processor cores, modules 110, 112, 114, and 116 may be cache memories, and modules 102, 104, 106, and 108 may be respectively associated with modules 110, 112, 114, and 116 as was described above. In this example, processing circuitry 12 may determine that module 110 is faulty and, in response, may configure module 102 to communicate with module 112 instead of module 110 and may configure module 112 to communicate with module 102. Consequently, subsequent to the reconfiguration, module 112 may store instructions and data for both module 102 and module 104.

In selecting a module to be substituted for faulty module 110, processing circuitry 12 may use a substitution criterion. Accordingly, upon detecting that module 110 is faulty, processing circuitry 12 may analyze modules 112, 114, and 116 with respect to the substitution criterion. Based on the analysis, processing circuitry 12 may select a substitute module from among modules 112, 114, and 116 (e.g., module 112) to be associated with module 102 instead of module 110 (which is faulty). Processing circuitry 12 may then configure the substitute module to communicate with module 102 and may configure module 102 to communicate with module 112 instead of module 110. Consequently, module 102 may subsequently process instructions even though module 110 is faulty.

Referring to FIG. 2, another embodiment of a processor is illustrated. In this embodiment, the processor is a single monolithic integrated circuit chip 200 having four different types of modules: processor cores, cache memories, memory controllers, and I/O controllers. Chip 200 includes eight processor cores 202, 204, 206, 208, 210, 212, 214, and 216 and eight cache memories 218, 220, 222, 224, 226, 228, 230, and 232. In addition, chip 200 includes four memory controllers 236, 240, 244, and 248 and four I/O controllers 234, 238, 242, and 246. Chip 200 also includes interconnection circuitry 234.

Four external memories 250, 252, 254, and 256 are also depicted in FIG. 2. External memories 250, 252, 254, 256 may store instructions that may be executed by the processing cores of chip 200 and may also store data associated with the execution of the instructions. External memories 250, 252, 254, and 256 may be physically distinct from chip 200 in one embodiment. In other words, external memories 250, 252, 254, and 256 may be implemented as one or more integrated circuit chips distinct from chip 200.

Memory controllers 236, 240, 244, and 248 may facilitate the transfer of data (e.g., data lines) between the cache memories of chip 200 and external memories 250, 252, 254, and 256. In one embodiment, one memory controller may be shared by two of the cache memories of chip 200. For example, memory controller 236 may communicate both with cache memory 218 and cache memory 220.

Cache memories 218, 220, 222, 224, 226, 228, 230, and 232 may store data and instructions retrieved from external memories 250, 252, 254, and 256 via memory controllers 236, 240, 244, and 248. In addition, the cache memories of chip 200 may store data received from the processor cores of chip 200. Memory controllers 236, 240, 244, and 248 may subsequently store the data received from the processor cores of chip 200 in external memories 250, 252, 254, and 256.

Processor cores 202, 204, 206, 208, 210, 212, 214, and 216 may execute instructions retrieved from the cache memories of chip 200. In doing so, the processor cores may use data stored in the cache memories of chip 200 and may write data resulting from the executing of the instructions into the cache memories. In one configuration, each processor core of chip 200 may execute instructions which are independent and/or different from instructions executed by the other processor cores of chip 200. For example, processor core 202 may execute a set of instructions (e.g., of a first application) and processor core 204 may independently execute a different set of instructions (e.g., or a second application). Alternatively, processor cores 202 and 204 may redundantly execute the same set of instructions, perhaps independent of each other, without interacting with each other in one embodiment.

I/O controllers 234, 238, 242, and 246 may facilitate communication between a processor core of chip 200 and a device external to chip 200 such as another processor or a voter (described further below). In one embodiment, two processor cores may share one I/O controller. For example, I/O controller 234 may communicate via interconnection circuitry 234 with both processor core 202 and processor core 204.

The modules of chip 200 may be associated with each other in a particular way. For example, processor core 202 may be associated with and/or may communicate with cache memory 218, memory controller 236, and I/O controller 234. Similarly, processor core 204 may be associated with cache memory 220, memory controller 236, and I/O controller 234; processor core 206 may be associated with cache memory 222, memory controller 240, and I/O controller 238; processor core 208 may be associated with cache memory 224, memory controller 240, and I/O controller 238; processor core 210 may be associated with cache memory 226, memory controller 244, and I/O controller 242; processor core 212 may be associated with cache memory 228, memory controller 244, and I/O controller 242; processor core 214 may be associated with cache memory 230, memory controller 248, and I/O controller 246; and processor core 216 may be associated with cache memory 232, memory controller 248, and I/O controller 246. In one embodiment, these associations may be reconfigurable.

Interconnection circuitry 234 may enable communication between the processor cores, cache memories, I/O controllers, and memory controllers of chip 200. As is depicted in FIG. 2, in one embodiment, interconnection circuitry 234 may be a ring 260. Other embodiments of interconnection circuitry 234 are also possible. For example, interconnection circuitry 234 may be a mesh or a cross bar.

Over time, modules of chip 200 may become faulty for one or more of a number of different reasons, for example, due to a persistent hardware error. A faulty module may prevent other modules of chip 200 from performing their functions.

For example, if memory controller 236 is faulty, cache memories 218 and 220 might not be able to exchange data with memory 250 and might not be able to provide instructions to processor cores 202 and 204 respectively. Accordingly, processor cores 202 and 204, cache memories 218 and 220, and I/O controller 234 may be unable to perform useful functions as a result of memory controller 236 being faulty.

Processing circuitry 12 may detect faulty modules of chip 200 (e.g., by detecting hardware errors) and may subsequently reconfigure one or more of the modules of chip 200 to preserve functionality of chip 200 despite the faulty modules.

Referring to FIG. 2A, chip 200 of FIG. 2 is illustrated. In FIG. 2A, however, processing circuitry 12 has determined that cache memory 218 is faulty (indicated by the large "X" over cache memory 218). As was described above, cache memory 218 may, in one embodiment, be associated with processor core 202. Accordingly, since cache memory 218 is faulty, processor core 202 may be unable to process instructions and may be otherwise unable to perform a useful function. To enable processor core 202 to continue to process instructions despite the fact that cache memory 218 is faulty, processing circuitry 12 may select a substitute cache memory from among the other cache memories of chip 200 and reconfigure the substitute cache memory so that it is associated with processor core 202.

Processing circuitry 12 may use one or more substitution criteria when selecting a substitute cache memory for processor core 202 from among cache memories 220, 222, 224, 226, 228, 230, and 232. In one embodiment, the substitution criterion may be specified prior to processing circuitry 12 determining that cache memory 218 is faulty. In one embodiment, a certain module may be selected as substitute module based on a combination of substitution criteria. For example, in one embodiment, the certain module may be selected if all of the substitution criteria are acceptable. In another embodiment, the various substitution criteria of the certain module may be added and evaluated compared with criteria for other modules. Other combinations of substitution criteria are also possible, such as a weighted averages.

In one embodiment, a first selection criterion may comprise a distance relationship between processor core 202 and the potential substitute cache memory. For example, the substitution criterion may specify that the substitute cache memory may be no more than a particular distance away from processor core 202. Accordingly, processing circuitry 12 may determine distances from processor core 202 to cache memories 220, 222, 224, 226, 228, 230, and/or 232 and may subsequently determine which of these cache memories are within the particular distance of processor core 202. In one embodiment, the particular distance may be related to a tolerable amount of latency introduced when two modules separated by the particular distance communicate. Furthermore, the particular distance may be selected to prevent performance and/or contention problems that may arise if processor core 202 is more than the particular distance away from the substitute cache memory.

By way of example, processing circuitry 12 may analyze cache memory 232 to determine whether cache memory 232 satisfies the selection criterion and may determine that cache memory 232 does not satisfy the selection criterion because a distance between cache memory 232 and processor core 202 is greater than the particular distance. In contrast, processing circuitry 12 may analyze cache memory 220 and determine that cache memory 220 may be the substitute cache memory because cache memory 220 is within the particular distance of processor core 202.

In one embodiment, another selection criterion may be satisfied if interconnection circuitry 234 is configured to relay communications between processor core 202 and the substitute cache memory. In some embodiments, interconnection circuitry 234 might not provide a direct connection between each module of chip 200 and every other module of chip 200. Instead, interconnection circuitry 234 may provide communications between two modules of chip 200 via one or more other modules of chip 200.

For example, if interconnection circuitry 234 is a mesh rather than a ring, interconnection circuitry 234 may provide communications between processor core 202 and cache memory 226 via processor core 210. Accordingly, if in addition to cache memory 218 being faulty processor core 210 is also faulty, interconnection circuitry 234 might not enable communications between processor core 202 and cache memory 226. Consequently, processing circuitry 12, upon analyzing cache memory 226, may determine that cache memory 226 does not satisfy the substitution criterion and therefore processing circuitry 12 might not select cache memory 226 as the substitute cache memory.

In one embodiment, another selection criterion may comprise a thermal relationship between processor core 202 and the potential substitute cache memory. The substitution criterion may specify that a thermal profile of chip 200 should not be violated by anticipated thermal behavior if a certain substitute cache memory is chosen. For example, the thermal profile may specify particular amounts of heat that may be generated by corresponding regions of chip 200. In this example, a cooling device (not illustrated) configured to cool chip 200 may be able to cool chip 200 if chip 200 is within the thermal profile, but not if chip 200 is outside of the thermal profile. Accordingly, selecting a substitute cache memory that could generate an amount of heat in a region of chip 200 that violates the thermal profile might not satisfy the substitution criterion in one embodiment.

In one embodiment, another selection criterion may be satisfied if a service level agreement associated one of the modules of chip 200 is met despite the selection of the substitute cache memory. For example, a service level agreement associated with processor core 204 may specify that a cache memory associated with processor core 204 may not be shared with another processor core. Consequently, cache memory 220 might not satisfy the selection criterion because if cache memory 220 was selected as the substitute cache memory, cache memory 220 may be shared by processor cores 202 and 204.

However, processor core 206 might not be subject to the service level agreement. Consequently, cache memory 222 may be selected as the substitute cache memory for processor core 206 without violating the service level agreement. Accordingly, cache memory 222 may satisfy the selection criterion for processor core 206.

Processing circuitry 12 may use one of the selection criterion described above or a combination of a plurality of the selection criterion described above when selecting a substitute cache memory for processor core 202. Although the above discussion has centered on the use of a substitution criterion (or criteria) to select a substitute cache memory for processor core 202, the substitution criterion (or criteria) may be used in the selection of other types modules of chip 200. In addition, other criteria may be used.

For example, if a processor core of chip 200 is faulty, processing circuitry 12 may use the substitution criteria to reconfigure the cache memory associated with the faulty processor core so that the cache memory is associated with a different processor core of chip 200 (e.g., which may replace the faulty processor core). Doing so may enable the processor core to which the cache memory is newly associated to operate more efficiently because the processor core may now be associated with two cache memories rather than one cache memory and perhaps replace functions of the faulty processor core.

Similarly, in one configuration, processing circuitry 12 may use the substitution criteria to reconfigure modules of chip 200 in response to detecting a faulty memory controller or I/O controller. Note that in this configuration, since a single memory controller may service two cache memories, two processor cores of chip 200 may be affected by a single faulty memory controller. Similarly, a single faulty I/O controller may affect two processor cores of chip 200.

In some embodiments, the modules of chip 200 may be allocated among a plurality of fault domains. Fault domains may be used to isolate groups of modules from each other so that faults occurring in one fault domain are prevented from causing faults or errors to occur in another fault domain.

Referring to FIG. 2B, a configuration of chip 200 implementing two fault domains 262 and 264 is illustrated. In addition to chip 200, the modules of chip 200 described above, and memories 250, 252, 254, and 256, two power supplies 270 and 274 are illustrated.

Fault domain 262 includes the following modules of chip 200: processor cores 202, 204, 206, and 208; cache memories 218, 220, 222, and 224; I/O controllers 234 and 238; and memory controllers 236 and 240. In addition, fault domain 262 includes a ring 266 of interconnection circuitry 234. Ring 266 enables communication between the modules of fault domain 262 but, in this embodiment, does not enable communication between modules of fault domain 262 and fault domain 264. In one embodiment, the modules of fault domain 262 may receive power from power supply 270 via a conductor 272 (e.g., one or more pins of chip 200).

Fault domain 264 includes the following modules of chip 200: processor cores 210, 212, 214, and 216; cache memories 226, 228, 230, and 232; I/O controllers 242 and 246; and memory controllers 244 and 248. In addition, fault domain 264 includes a ring 268 of interconnection circuitry 234. Ring 268 enables communication between the modules of fault domain 264 but, in this embodiment, does not enable communication between modules of fault domain 264 and fault domain 262. In one embodiment, the modules of fault domain 264 may receive power from power supply 274 via a conductor 276 (e.g., one or more pins of chip).

Fault domain 262 may be isolated from fault domain 264 in that a failure of one of the modules associated with fault domain 262 (e.g., memory controller 236) may be prevented from affecting the modules associated with fault domain 264. In one embodiment, modules of fault domain 262 may fault isolated from modules of fault domain 264. For example, modules of fault domain 262 may be prevented from communicating directly with modules of fault domain 264.

In one embodiment, a single application may be redundantly executed in both fault domain 262 and fault domain 264. For example, processor core 202 may execute the application and processor core 210 may also execute the same application. At a particular point in the execution, the results of executing the application on processor core 202 may be compared with results of executing the application on processor core 210.

For example, processor core 202 may forward results of executing the application to I/O controller 234, which may forward the results to a voter 278. Similarly, processor core 210 may forward results of executing the application to I/O controller 242, which may forward the results to voter 278.

Voter 278 may then compare the execution results from processor core 202 with the execution results from processor core 210.

If neither processor core 202 nor processor core 210 encountered an error while executing the application (e.g., an error due to radiation such as an alpha particle) the results of executing the application on processor core 202 should be the same as the results of executing the application on processor core 210. If the results are not the same, processing circuitry 12 may return processor core 202 and processor core 210 to a checkpoint in the application at which processor cores 202 and 210 had matching results and the application may be re-executed from the checkpoint.

As was described above in relation to FIG. 2A, processing circuitry 12 may detect faulty modules of chip 200 and may subsequently reconfigure one or more of the modules of chip 200 to preserve functionality of chip 200 despite the faulty modules. For example, processing circuitry 12 may determine that cache memory 218 is faulty as was described above.

Instead of or in addition to the substitution criteria described above, due to the use of fault domains, processing circuitry 12 may use other substitution criteria when selecting a substitute cache memory for processor core 202 from among cache memories 220, 222, 224, 226, 228, 230, and 232.

In one embodiment, the selection criterion may be related to the allocation of modules among fault domains 262 and 264. For example, the selection criterion may be satisfied if processor core 202 and the substitute cache memory are both allocated to fault domain 262.

By way of example, processing circuitry 12 may analyze cache memory 232 to determine whether cache memory 232 satisfies the selection criterion and may determine that cache memory 232 does not satisfy the selection criterion because cache memory 232 is allocated to fault domain 264 rather than fault domain 262. In contrast, processing circuitry 12 may analyze cache memory 220 and determine that cache memory 220 may be the substitute cache memory because cache memory 220 belongs to the same fault domain as processor core 202, namely fault domain 262.

In one embodiment, the selection criterion may be satisfied if interconnection circuitry 234 is configured to relay communications between processor core 202 and the substitute module. For example, the selection criterion may be satisfied by cache memories 220, 222, and 224 since these cache memories have communication with processor core 202 via ring 266. However, the selection criterion might not be satisfied by cache memories 226, 228, 230, and 232 since these cache memories are not connected to ring 266.

In one embodiment, the selection criterion may comprise a power relationship between processor core 202 and the substitute module. For example, the selection criterion may be satisfied if both processor core 202 and the substitute module are configured to receive power from power supply 270 via conductor 272. Accordingly the selection criterion may be satisfied by cache memories 220, 222, and 224 since these modules receive power from power supply 270 via conductor 272 but might not be satisfied by cache memories 226, 228, 230, and 232 since these cache memories receive power from power supply 274 via conductor 276 rather than from power supply 270 via conductor 272.

Processing circuitry 12 may use one of the criterion described above or a combination of a plurality of the criterion described above when selecting a substitute cache memory for processor core 202. Although the above discussion has centered on the use of a substitution criterion (or criteria) to select a substitute cache memory for processor core 202, the substitution criterion (or criteria) may be used in the selection of other substitute modules of chip 200.

In some embodiments, upon detecting that one or more modules are faulty, processing circuitry 12 may determine that due to the faulty module(s), the non-faulty modules of chip 200 are disproportionately allocated among fault domains 262 and 264. Consequently, processing circuitry 12 may reallocate one or more modules of chip 200 from fault domain 262 to fault domain 264 (or vice versa) thereby increasing the proportionality of the allocation of the non-faulty modules of chip 200 among fault domains 262 and 264.

Referring to FIG. 2C, chip 200 having the configuration of FIG. 2B is illustrated. In FIG. 2C, however, processing circuitry 12 has determined that processor cores 202 and 204 are faulty, as indicated by the large "X"s over processor cores 202 and 204. In response to determining that processor cores 202 and 204 are faulty, processing circuitry 12 may determine that the non-faulty processor cores of chip 200 (processor cores 206, 208, 210, 212, 214, and 216) are disproportionately allocated among fault domains 262 and 264 since fault domain 262 has two non-faulty processor cores (processor cores 206 and 208) and fault domain 264 has four non-faulty processor cores (processor cores 210, 212, 214, and 216).

Consequently, processing circuitry 12 may reconfigure processor core 210 so that processor core 210 is associated with fault domain 262 instead of fault domain 264. As a result, fault domains 262 and 264 may each have three non-faulty process cores.

Referring to FIG. 2D, chip 200 is illustrated with fault domains 262 and 264 having a different configuration than in FIG. 2C. In FIG. 2D, fault domain 262 has been reconfigured to include processor core 210 and fault domain 264 has been reconfigured to exclude processor core 210. In addition, interconnection circuitry 234 has been modified so that ring 266 is connected to processor core 210 and so that ring 268 is no longer connected to processor core 210.

In one embodiment, as an alternative to reallocating modules of chip 200 among existing fault domains as was described above, in one configuration, processing circuitry 12 may change the number of fault domains of chip 200 by creating one or more additional fault domains or by deleting one or more existing fault domains. Processing circuitry 12 may then reallocate the non-faulty modules of chip 200 among the new number of fault domains. In doing so, processing circuitry 12 may balance, so far as is possible, the number of modules assigned to each fault domain so that the fault domains have the same number of modules.

The protection sought is not to be limited to the disclosed embodiments, which are given by way of example only, but instead is to be limited only by the scope of the appended claims.

Further, aspects herein have been presented for guidance in construction and/or operation of illustrative embodiments of the disclosure. Applicant(s) hereof consider these described illustrative embodiments to also include, disclose and describe further inventive aspects in addition to those explicitly disclosed. For example, the additional inventive aspects may include less, more and/or alternative features than those described in the illustrative embodiments. In more specific examples, Applicants consider the disclosure to include, disclose and describe methods which include less, more and/or alternative steps than those methods explicitly disclosed as well as apparatus which includes less, more and/or alternative structure than the explicitly disclosed structure.

What is claimed is:

1. A processor configuration method comprising:
providing a first conductor configured to receive power from a first power supply;
providing a second conductor configured to receive power from a second power supply;
determining that a first module is faulty, and configuring a second module to communicate with the first module when the first module is not faulty;
analyzing a third module with respect to substitution criteria, wherein a substitution criterion is satisfied if both the first module and the third module are configured to receive power from a same one of the first and second conductors after the configuration;
selecting the third module based on the analyzing and determining that the third module satisfies at least one of the substitution criteria; and
subsequent to the selecting, configuring the second module to communicate with the third module instead of the first module.

2. The method of claim 1 further comprising:
prior to the selecting the third module, analyzing a fourth module with respect to the substitution criteria, the fourth module being configured to perform substantially the same function as the first module; and
prior to the selecting the third module, determining that the fourth module does not satisfy at least one of the substitution criteria.

3. The method of claim 2 wherein:
a substitution criterion is satisfied if the second and third modules are both allocated to a first fault domain;
the fourth module is allocated to a second fault domain which is different than the first fault domain; and
the first and second fault domains are configured to execute instructions independent of each other and modules allocated to the first fault domain are fault isolated from modules allocated to the second fault domain.

4. The method of claim 1 wherein at least one of the substitution criteria exist prior to the determining that a first module is faulty.

5. The method of claim 1 wherein the first module and the third module are configured to perform substantially the same function and the second module and the third module are configured to perform different functions.

6. The method of claim 1 wherein a substitution criterion comprises a distance relationship between the second and third modules.

7. The method of claim 1 wherein a substitution criterion comprises a thermal relationship between the second and third modules.

8. The method of claim 1 wherein a substitution criterion is satisfied if interconnection circuitry is configured to relay communications between the second module and the third module.

9. A processor configuration method comprising:
providing a first conductor configured to receive power from a first power supply;
providing a second conductor configured to receive power from a second power supply;
providing a plurality of modules allocated among a plurality of fault domains, wherein individual fault domains of the plurality are configured to execute instructions independent of the other fault domains of the plurality;
first determining one module of the plurality is faulty;
after the first determining, second determining that modules of the plurality that are not faulty are disproportionately allocated among the plurality of fault domains; and reallocating another module of the plurality, configured to receive power from a same one of the first and second conductors as the one faulty module, from one fault domain of the plurality to a different fault domain of the plurality responsive to the second determining.

10. The method of claim 9 wherein the reallocating comprises reconfiguring an interconnect so that the another module of the plurality is able to communicate with circuitry associated with the different fault domain and wherein prior to the reallocating, the another module is fault isolated from the circuitry.

11. The method of claim 9 further comprising, changing the number of fault domains of the plurality based on the second determining.

12. The method of claim 9 wherein prior to the first determining, the one module of the plurality and another module of the plurality are both configured to independently perform substantially a same function using same data, the one module being allocated to a first fault domain of the plurality and the another module being allocated to a second fault domain of the plurality different from the first fault domain.

13. The method of claim 9 wherein the modules of the plurality are modules of a single monolithic integrated circuit and wherein at least some of the modules of the single monolithic integrated circuit comprise processor cores.

14. An integrated circuit comprising:
a first module of a processor;
a plurality of additional modules;
a first conductor configured to receive power from a first power supply;
a second conductor configured to receive power from a second power supply; and
processing circuitry configured to determine that the first module is faulty, to select a replacement module from among the plurality of additional modules according to a substitution criterion, wherein the substitution criterion is satisfied if both the first module and the replacement module are configured to receive power from a same one of the first and second conductors after the configuration, and to configure the replacement module to replace the first module.

15. The integrated circuit of claim 14 wherein:
the integrated circuit is a monolithic chip multi processor and at least some of the plurality of additional modules comprise processor cores;
the processor cores are configured to independently execute instructions; and
the processing circuitry comprises at least one of the processor cores.

16. The integrated circuit of claim 14 wherein the substitution criterion is satisfied if a thermal profile of the integrated circuit is not violated by anticipated thermal behavior of the plurality of modules after the configuration.

17. The integrated circuit of claim 14 wherein the first module and the replacement module are physically distinct from each other and the substitution criterion is satisfied if the first module is located no more than a particular distance away from the replacement module after the configuration.

18. The integrated circuit of claim 14 wherein the substitution criterion is satisfied if a service level agreement associated with processing performed by one or more of the modules is met after the configuration.

* * * * *